United States Patent
Belzberg

[15] 3,701,450
[45] Oct. 31, 1972

[54] SELF-HOLDING TUBE END CLOSURES

[72] Inventor: Samuel I. Belzberg, Cote St. Luc, Quebec, Canada

[73] Assignee: Unican Security Systems, Ltd., Montreal, Quebec, Canada

[22] Filed: March 24, 1971

[21] Appl. No.: 127,697

[52] U.S. Cl. ............... 220/24, 220/42 B, 248/188.8, 248/188.9
[51] Int. Cl. ............................................. B65d 41/00
[58] Field of Search .. 220/24, 42 B; 248/188.8, 188.9

[56] References Cited

UNITED STATES PATENTS

| | | |
|---|---|---|
| 2,568,507 | 9/1951 | Miller .................. 248/188.8 X |
| 1,482,205 | 1/1924 | Uhl ....................... 248/188.9 |
| 849,415 | 4/1907 | McGowan ................ 220/24 R |
| 2,546,492 | 3/1951 | Booth .................... 248/188.8 |
| 2,666,943 | 1/1954 | Kramcsak, Jr. ...... 248/188.9 X |
| 3,520,507 | 7/1970 | Strong .................. 248/188.8 |

FOREIGN PATENTS OR APPLICATIONS

| | | | |
|---|---|---|---|
| 127,430 | 4/1948 | Australia ............... 248/188.8 |
| 500,973 | 3/1954 | Canada ................. 148/188.9 |
| 541,293 | 5/1957 | Canada ................. 248/188.8 |

Primary Examiner—M. Henson Wood, Jr.
Assistant Examiner—Thomas C. Culp, Jr.
Attorney—Ira Milton Jones

[57] ABSTRACT

A closure for an end of a square cross section tube comprises a base member having sides corresponding to those of the tube and a stem projectable into the end of the tube. A anchor disc is axially immovably connected to the outer end of the stem but can be rotated about the axis thereof. Barb-like fingers on the periphery of the disc allow insertion thereof into the tube end but preclude its withdrawal therefrom. The fingers also prevent rotation of the disc about its axis after it has entered the tube end. During application of the closure to a tube end, the base and stem can be unitarily rotated with respect to the disc to dispose locating elements on the base in position to enter the tube end and cooperate with internal wall surfaces thereof in holding the base member with its sides in coincidence with those of the tube.

6 Claims, 6 Drawing Figures

PATENTED OCT 31 1972 3,701,450
FIG.1.
FIG.2.
FIG.3.
FIG.4.
FIG.5.
FIG.6.
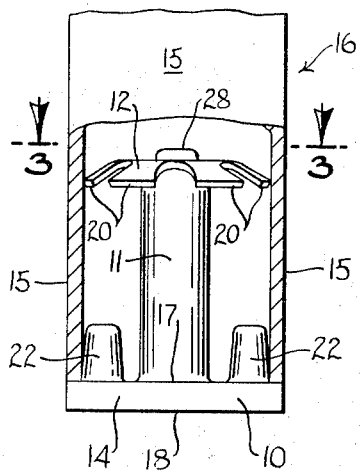
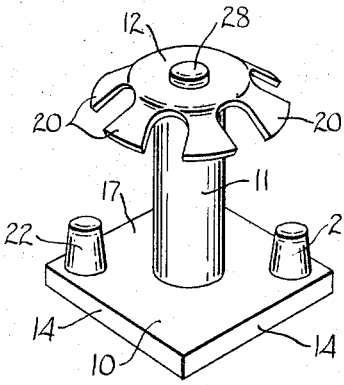
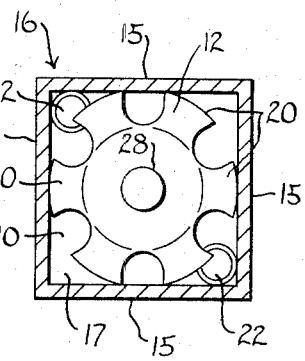
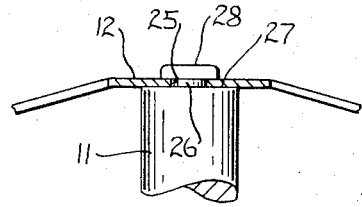
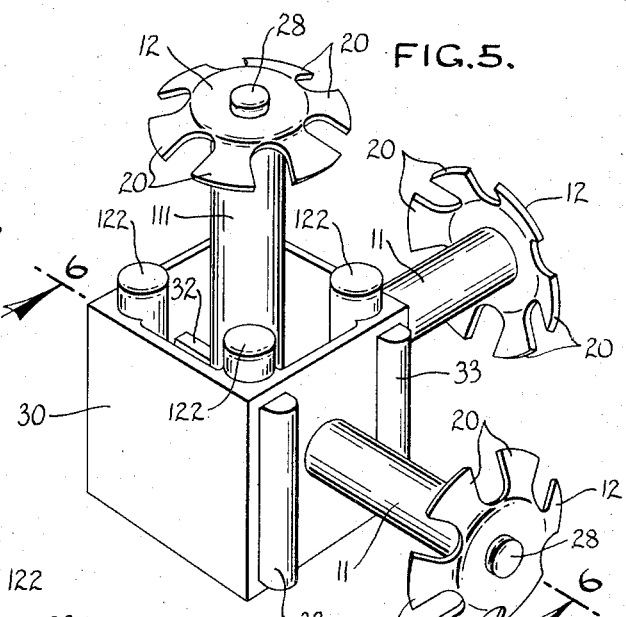
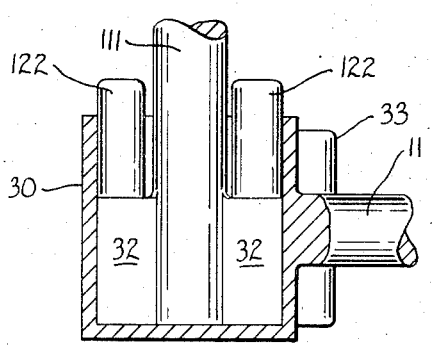
INVENTOR
Samuel I. Belzberg
BY
ATTORNEY

SELF-HOLDING TUBE END CLOSURES

This invention relates to structures which are fabricated from tubular members of rectangular or square cross section, and of which chairs, tables and modular shelving are examples.

More particularly, this invention refers to closures for the ends of rectangular or square cross section tubular members, as well as to closure members which also serve to couple together the ends of a plurality of such tubular members at a corner, or the like, of the structure in which the tubular members are employed.

In general, it is the object of this invention to provide a closure for the ends of square cross section tubing featuring anchor and locating members which are engageable in the end of the tube to respectively anchor the closure against displacement therefrom and to locate the closure in such relationship to the square cross section tube that flat sides on the closure are maintained in coincidence with those of the tube.

In the past, self holding closure devices have been provided for the ends of round cross section tubing, featuring an anchoring member to engage in the end of the tubing and prevent displacement of the closure device therefrom. It was customary to fix such anchoring members coaxially to a base or glide of the same diameter as the tubular member to which it was to be applied. As a result, the only problem encountered in the application of such a closure device to the end of a length of round cross section tubing was that of assuring coaxiality between the round glide and the tubing.

The problem is more complicated where square or rectangular cross section tubing is concerned, since it entails alignment of flat sides of the closure device with corresponding sides on the tubing.

Accordingly, it is an object of this invention to provide a closure for the ends of square or rectangular cross section tubing with a base of the same rectangular outline as the tubing, and wherein an anchoring member is so connected to the base as to allow relative rotation between the base and the tubing, during application of the closure thereto, the degree necessary to bring locating members on the base to the proper angular position at which they can enter the tubing and cooperate with the walls thereof in holding the base with its side walls in coincidence with those of the tubing.

It is a further object of the invention to provide tube closure means having characteristics such as described in the preceding object, but which is especially adapted for use as a coupling for connecting a number of tubes together at the corner of a table or the like.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of the embodiments of the invention constructed according to the best modes so far devised for the practical application of the principles thereof, and in which:

FIG. 1 is a view partly in elevation and partly in section of a square cross section tube end having a closure device of this invention in place thereon;

FIG. 2 is a perspective view of the closure device per se;

FIG. 3 is a cross section taken through FIG. 1 on the line 3—3;

FIG. 4 is an enlarged fragmentary view of the connection between the stem and anchoring member;

FIG. 5 is a perspective view of a combination closure and coupling device embodying this invention; and FIG. 6 is a sectional view taken through the device of FIG. 5 on the line 6—6.

Referring now to the accompanying drawings, and particularly to FIG. 2, it will be seen that the tube end closure of this invention comprises a base 10, a stem 11 fixed to the base, and an anchor member 12 carried by the stem at its outer extremity.

The base can be in the nature of a substantially thin flat plate such as shown, with flat side edges 14 that correspond in number and size to the sides 15 of a rectangular cross section tube 16, one end of which is to be closed by the device of this invention. In the present case, the sides 15 of the tube are all of the same width, which is the same as saying that the tube has a square cross section. The base, of course, has a square outline of the same dimensions as the tube.

As stated, the base can be considered as a substantially thin plate having parallel inner and outer flat faces 17 and 18, respectively, which are normal to the axis of the stem. If it is assumed that the tube 16 is one of the upright legs of a table and the lower end of the tube is closed by the device of this invention, the face 17 of the base lies at its top and flatwise abuts the bottom of the tube. The face 18 of the base is at the bottom and is adapted to rest on the floor. The stem 11 rises vertically from the center of the upper face 17 and extends upwardly a distance into the interior of the tube, coaxial therewith.

The anchor member 12 is mounted on the upper extremity of the stem, coaxially therewith. It has a number of barb-like fingers 20 on its periphery which are slanted downwardly and outwardly relatively to the stem axis. Hence, outer end portions of the fingers have sharp edges and/or corners which are presented to the interior wall surfaces of the tube. These edges on the barb-like fingers 20 do not materially interfere with passage of the anchor member upwardly into the interior of the tube during installation of the closure device thereon, due to the downward and outward slant of the fingers and to the fact that the fingers have a certain degree of resiliency. These edges do, however, bite into the inner wall surfaces of the tube to positively prevent displacement of the closure device therefrom.

Locating elements 22 which are fixed with respect to the base rise from opposite locations on its upper surface 17 to have engagement with the internal wall surfaces of the tube to hold the base with its flat side edges 14 in coincidence with the sides 15 of the square cross section tube. The locating elements 22 seen in FIGS. 1, 2 and 3 comprise a pair of substantially short posts which taper to a slightly smaller diameter at their tops and which are so placed that their bases are disposed adjacent to two diagonally opposite corners of the base. Hence, the locating posts can engage in diametrically opposite corners of the tube so as to hold the square base against turning movement out of a position at which its side edges are coincident with the sides of the tube.

During application of the closure device described to the end of a square cross section tube, it is necessary to forcefully drive the anchor member 12 into the interior of the tube. Because of the effectiveness with which its barb-like fingers bite into the walls of the tube at its interior, the anchor member can be neither turned about the axis of the stem 11 relative to the tube, nor can it be withdrawn from the tube. Hence, it would ordinarily be more or less accidental if the locating elements 22 were in positions to properly enter opposite corner portions of the square cross section tube during the final assembling motion of the closure thereon. Fixtures or the like having guiding engagement with both the tube end and the closure therefor could, of course, be provided to assure the desired coincidental relationship between the flat side edges on the base and the flat sides of the tube during the entire assembling operation.

According to this invention, the expense of providing fixtures for the assembly operation in question can be obviated if the anchor member 12 is secured to the extremity of the stem as seen in FIG. 4, in a way that precludes relative axial motion therebetween but provides for rotary motion of the anchor member relative to the stem about the axis of the latter. For that purpose, the anchor member is provided with a round central aperture 25 to somewhat loosely receive a turned down neck 26 on the extremity of the stem. There is thus formed at the base of the neck a shoulder 27 upon which the anchor member 12 rests. It is held against displacement from the stem by peening a portion of the neck over it, as at 28, so that the anchor member is axially immovable relative to the stem.

It is important to realize that the neck does not fit so tightly in the aperture 25 as to preclude turning of the anchor member thereon. Nor is the neck peened over the anchor member so tightly as to interfere with whatever rotary adjustment of the base and stem as a unit, relative to the anchor member may be necessary during final assembling motion of the stem into the tube, in order to bring the locating elements into diametrically opposite corners of the tube. Moreover, the described connection between the anchor member and the stem should be such as to enable such final adjustment of the base by hand, without the use of tools.

FIGS. 5 and 6 disclose how this invention can be embodied in a closure device that also serves as a coupling between a number of square section tubes, as at the corner of a table the frame of which is constructed of such tubes. As therein seen, there are three stems 11 each with an anchor member 12 rotably attached to its extremity in the manner described, and all fixed to a base 30 of substantially cubical shape. The stems project centrally from three adjoining sides of the base, and they are again flanked by locating elements as shown. The base can be made as a solid die casting, but it is here shown as of hollow construction. Its hollow interior opens to one of the faces of the base which is to have abutting engagement with the end of a tube to be closed thereby. Locating posts 122 are formed integrally with the base at its open side, for the purpose described hereinbefore.

One of the stems 111 extends down into the open side of the base to have its inner end joined to the wall at the opposite side of the base and to have its opposite sides connected by radial ribs 32 to two flanking walls of the base.

The two adjoining stems 11 project from solid faces of the base, and are flanked by a pair of elongated locating elements or ribs 33 which are parallel to one another and to two opposite edges of the base. Like the posts 22, the elongated locating elements are also adapted to engage along the inner faces of two opposite sides of tubes joined by the coupling described, to hold the base with its flat sides in coincidence with the sides of square cross section tubes connected thereby.

From the foregoing description, together with the accompanying drawings, it will be readily apparent to those skilled in the art that this invention provides for closing and/or coupling together the ends of square cross section tubing in a most efficacious manner.

Those skilled in the art will appreciate that the invention can be embodied in forms other than as herein disclosed for purposes of illustration.

The invention is defined by the following claims:

1. A self holding closure for the end of a tube having a rectangular cross section, characterized by:
   A. a base having sides of substantially the same rectangular outline as the tube, said base having a surface which faces in one direction and is normal to said sides, and said surface being adapted for flush abutting engagement with the end of a rectangular cross section tube;
   B. a pair of locating elements on opposite portions of the base and extending in said direction beyond said surface for engagement with internal wall surfaces of a rectangular cross section tube having the closure applied thereto so as to hold the base with said sides thereof in coincidence with those of the tube;
   C. an elongated stem fixed to the base and extending therefrom in said direction a substantial distance beyond said surface so as to be received within the end portion of a rectangular cross section tube having the closure applied thereto;
   D. an anchor disc coaxially carried by the stem at its end remote from the base and having a number of resilient barb-like fingers on its periphery to engage internal wall surfaces of a rectangular cross section tube having the closure applied thereto and hold it against displacement from the tube;
   E. means so securing the disc to the stem as to preclude relative axial movement therebetween while providing for rotary movement of the base relative to the disc to whatever attitude is necessary for proper entrance of the locating elements thereon into the end of the tube during final assembling motion of the closure thereon;
   F. and the locating elements, stem and anchor disc constituting the sole structure extending beyond said surface of the base.

2. A self holding closure for the end of a tube having a rectangular cross section, comprising:
   A. a base having sides of substantially the same rectangular outline as the tube, said base having a surface which faces in one direction and is normal to said sides, and said surface being adapted for flush abutting engagement with the end of a rectangular cross section tube;
   B. a pair of locating elements on opposite portions of the base and extending in said direction beyond said surface for engagement with internal wall surfaces of a rectangular cross section tube having the closure applied thereto so as to hold the base with said sides thereof in coincidence with those of the tube;

C. an elongated stem fixed to the base and extending therefrom in said direction a substantial distance beyond said surface so as to be received within the end portion of a rectangular cross section tube having the closure applied thereto;

D. an anchor disc coaxially carried by the stem at its end remote from the base and having a number of resilient barb-like fingers on its periphery to engage internal wall surfaces of a rectangular cross section tube having the closure applied thereto and hold it against displacement from the tube;

E. means so securing the disc to the stem as to preclude relative axial movement therebetween while providing for rotary movement of the base relative to the disc to whatever attitude is necessary for proper entrance of the locating elements thereon into the end of the tube during final assembling motion of the closure thereon;

F. and wherein said locating elements comprise posts which have their axes parallel to that of the stem and which are located adjacent to diametrically opposite corner portions of the base to be engageable within opposite corner portions of the rectangular cross section tube.

3. A self holding closure for the end of a tube having a rectangular cross section, comprising:

A. a base having sides of substantially the same rectangular outline as the tube, said base having a surface which faces in one direction and is normal to said sides, and said surface being adapted for flush abutting engagement with the end of a rectangular cross section tube;

B. a pair of locating posts on opposite portions of the base and extending in said direction beyond said surface for engagement with internal wall surfaces of a rectangular cross section tube having the closure applied thereto so as to hold the base with said sides thereof in coincidence with those of the tube;

C. an elongated stem fixed to the base and extending therefrom in said direction a substantial distance beyond said surface so as to be received within the end portion of a rectangular cross section tube having the closure applied thereto;

D. an anchor disc coaxially carried by the stem at its end remote from the base and having a number of resilient barb-like fingers on its periphery to engage internal wall surfaces of a rectangular cross section tube having the closure applied thereto and hold it against displacement from the tube;

E. means so securing the disc to the stem as to preclude relative axial movement therebetween while providing for rotary movement of the base relative to the disc to whatever attitude is necessary for proper entrance of the locating elements thereon into the end of the tube during final assembling motion of the closure thereon;

F. and wherein said base comprises a substantially thin rectangular plate having the stem and posts fixed directly to one face thereof, and said one face of the plate providing said surface which is adapted for flush abutting engagement with the end of a rectangular cross section tube.

4. A self holding closure for the end of a tube having a rectangular cross section, comprising:

A. a base having sides of substantially the same rectangular outline as the tube, said base having a surface which faces in one direction and is normal to said sides, and said surface being adapted for flush abutting engagement with the end of a rectangular cross section tube;

B. a pair of locating elements on opposite portions of the base and extending in said direction beyond said surface for engagement with internal wall surfaces of a rectangular cross section tube having the closure applied thereto so as to hold the base with said sides thereof in coincidence with those of the tube;

C. an elongated stem fixed to the base and extending therefrom in said direction a substantial distance beyond said surface so as to be received within the end portion of a rectangular cross section tube having the closure applied thereto;

D. an anchor disc coaxially carried by the stem at its end remote from the base and having a number of resilient barb-like fingers on its periphery to engage internal wall surfaces of a rectangular cross section tube having the closure applied thereto so as to hold it against displacement from the tube;

E. means so securing the disc to the stem as to preclude relative axial movement therebetween while providing for rotary movement of the base relative to the disc to whatever attitude is necessary for proper entrance of the locating elements thereon into the end of the tube during final assembling motion of the closure thereon;

F. and wherein said locating elements comprise elongated parallel ribs which are adapted to lengthwise engage the internal surfaces of two opposite walls of the rectangular cross section tube.

5. A self holding closure for the end of a tube having a rectangular cross section, comprising:

A. a base having sides of substantially the same rectangular outline as the tube, said base having a surface which faces in one direction and is normal to said sides, and said surface being adapted for flush abutting engagement with the end of a rectangular cross section tube;

B. a pair of locating elements on opposite portions of the base and extending in said direction beyond said surface for engagement with internal wall surfaces of a rectangular cross section tube having the closure applied thereto so as to hold the base with said sides thereof in coincidence with those of the tube;

C. an elongated stem fixed to the base and extending therefrom in said direction a substantial distance beyond said surface so as to be received within the end portion of a rectangular cross section tube having the closure applied thereto;

D. an anchor disc coaxially carried by the stem at its end remote from the base and having a number of resilient barb-like fingers on its periphery to engage internal wall surfaces of a rectangular cross section tube having the closure applied thereto and hold it against displacement from the tube;

E. means so securing the disc to the stem as to preclude relative axial movement therebetween while providing for rotary movement of the base relative to the disc to whatever attitude is necessary for proper entrance of the locating elements thereon into the end of the tube during final assembling motion of the closure thereon;

F. said base having a cubical shape corresponding to the dimensions of a square cross section tube;

G. and the base having said locating elements, stems, and anchor discs thereon at a plurality of sides thereof.

6. The self holding closure of claim 5, further characterized by:

A. said cubically shaped base being hollow and open at one side;

B. one of said stems projecting out of the open side of the base from the wall thereof at the opposite side of the base;

C. and reinforcing ribs joining opposite sides of the stem with two opposite side walls of the base in the interior thereof.

* * * * *